May 10, 1966

R. J. MAIER 3,250,929

HEAT SINK CONSTRUCTION FOR GENERATOR REGULATORS

Filed Oct. 28, 1963

3 Sheets-Sheet 1

INVENTOR.

Richard J. Maier

BY

Harness, Dickey + Pierce

ATTORNEYS.

HEAT SINK CONSTRUCTION FOR GENERATOR REGULATORS

Filed Oct. 28, 1963

3 Sheets-Sheet 2

INVENTOR.
Richard J. Maier
BY
Harness, Dickey & Pierce
ATTORNEYS.

May 10, 1966 R. J. MAIER 3,250,929
HEAT SINK CONSTRUCTION FOR GENERATOR REGULATORS
Filed Oct. 28, 1963 3 Sheets-Sheet 3

INVENTOR.
Richard J. Maier
BY
Harness, Dickey & Pierce.
ATTORNEYS.

United States Patent Office 3,250,929
Patented May 10, 1966

3,250,929
HEAT SINK CONSTRUCTION FOR GENERATOR REGULATORS

Richard J. Maier, Pontiac, Mich., assignor to Syncro Corporation, Oxford, Mich., a corporation of Michigan
Filed Oct. 28, 1963, Ser. No. 319,466
9 Claims. (Cl. 310—68)

This invention relates to heat sink constructions for generator regulators, and more particularly to means for supporting and cooling components such as rectifier diodes or silicon controlled rectifiers adjacent to the stator of a generator having a regulating circuit.

It is an object of the invention to provide a novel and improved heat sink construction for this purpose which will occupy a small amount of space, require a minimum of wiring connections between the mounted components and the stator coils, will not interfere with the passage of cooling air for the coils, and may also act as electrical conducting means for portions of the circuit.

It is another object to provide a heat sink construction of this type which is adaptable for use either with a stator which is inside the rotor or one which surrounds the rotor, and in which portions of the heat sink supporting means will serve also to retain the stator coils on their core poles.

Other objects, features, and advantages of the present invention will become apparent from the subsequent description, taken in conjunction with the accompanying drawings.

Briefly, each illustrated embodiment of the invention comprises a plurality of circumferentially arranged arcuate segments of heat-conductive and electrically conductive metal having a relatively heavy cross section, the segments being adapted to support electronic components such as rectifier diodes or silicon controlled rectifiers so as to absorb and dissipate heat therefrom. The segments are secured to the poles of a laminated stator by insulative members which are disposed within the pole interstices, tightly engaging the poles and extending outwardly to one side thereof, the segments being secured to the outer ends of these insulative members. The insulative heat supporting members thus serve the additional function of retaining the coils in position on the stator poles.

Figure 1:
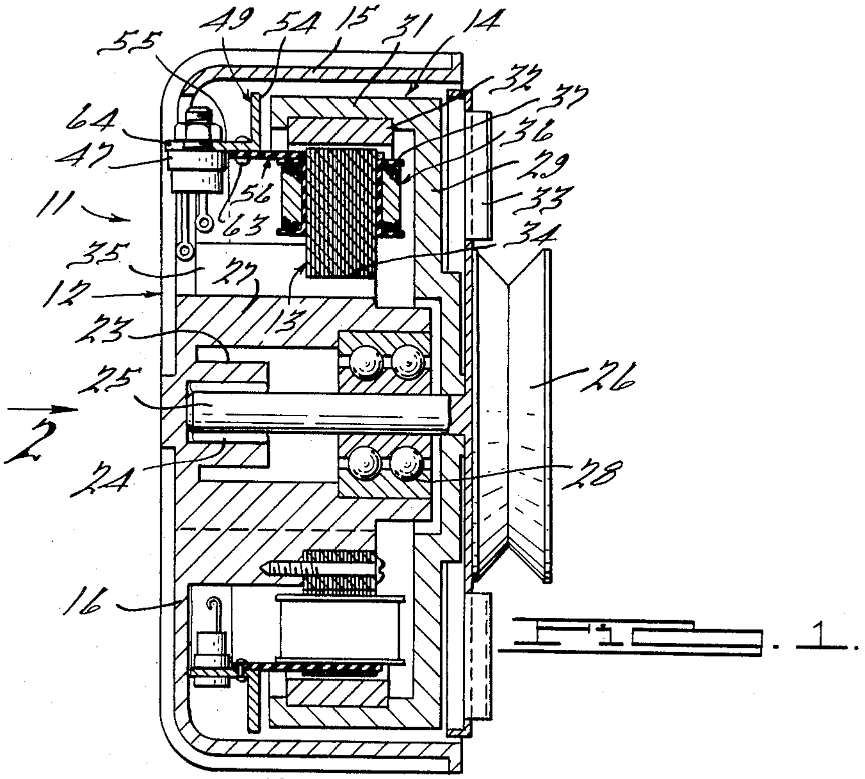
FIGURE 1 is a side elevational view in cross section taken along the line 1—1 of FIGURE 2, showing the mounting of a heat sink made in accordance with the invention on the stator assembly of a generator.
Figure 2:
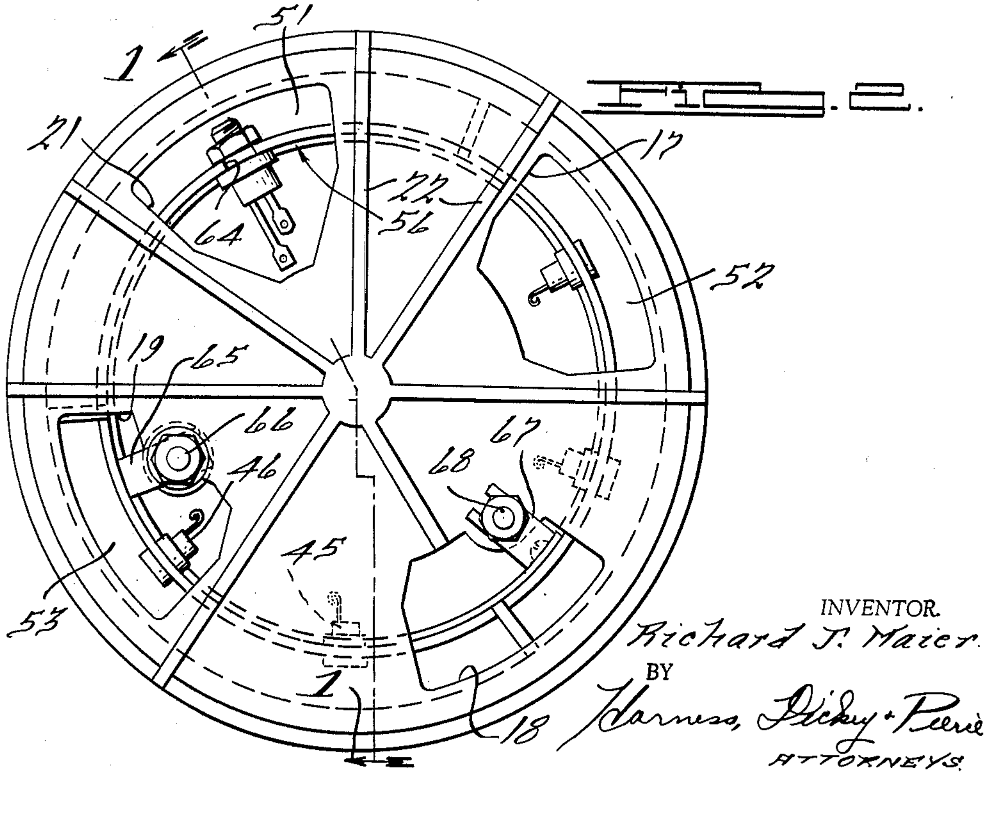
FIG. 2 is an end elevational view of the unit of FIGURE 1, taken in the direction of the arrow 2 of FIGURE 1 and showing the locations of the various components on the heat sink segments.

Referring more particularly to the drawings, the generator is generally indicated at 11 and comprises a housing generally indicated at 12 within which is mounted a stator generally indicated at 13 and a rotor generally indicated at 14 in FIGURE 1. Housing 12 is of generally bell-shaped construction, having a cylindrical wall portion 15 and an end wall 16 having a plurality of circumferentially spaced apertures 17, 18, 19 and 21, as seen in FIGURE 2 for air circulation purposes, as well as a plurality of radially arranged ribs 22. An interior hub 23 in housing 12, seen in FIGURE 1, carries an anti-friction bearing 24 supporting a shaft 25 which extends toward the open end of the housing and carries a drive pulley 26. An annular portion 27 of housing 12 surrounds portion 23 and extends outwardly therefrom, portion 27 supporting an anti-friction bearing 28 which in turn supports shaft 25. Rotor 14 comprises a flywheel 29 having openings therethrough secured to shaft 25 between bearing 28 and pulley 26, the flywheel having a cylindrical outer portion 31 spaced inwardly from housing wall 15 which carries a plurality of circumferentially spaced permanent magnets 32, seen in FIGURE 1. These magnets face inwardly and have arcuate inner surfaces surrounding stator 13. A fan 33 is also secured to shaft 25 between rotor 29 and pulley 26.

Stator 13 is mounted on a reduced portion 34 of a plurality of fins 35 which extend radially outwardly from housing portion 27, as seen in FIGURE 1. Stator 13 comprises an annular laminated core on which is mounted coil assemblies each of which is indicated 36. Each coil assembly comprises a bobbin 37 carrying two windings, one winding being a generator load winding and the other being a regulator winding for the generator. These windings are not separately seen in FIGURE 1, but the load windings of all poles are in series and are collectively indicated at 38 in FIGURES 5 and 6 while the regulating windings of all poles, also in series, are indicated 39 in these figures. A circuit of this type is shown and described in copending application Serial No. 199,811 filed June 4, 1962, by T. F. Carmichael et al. and assigned to the assignee of the present application. Bobbins 37 are mounted on a plurality of circumferentially spaced poles 40 extending radially outwardly from the stator core.

Figure 6:
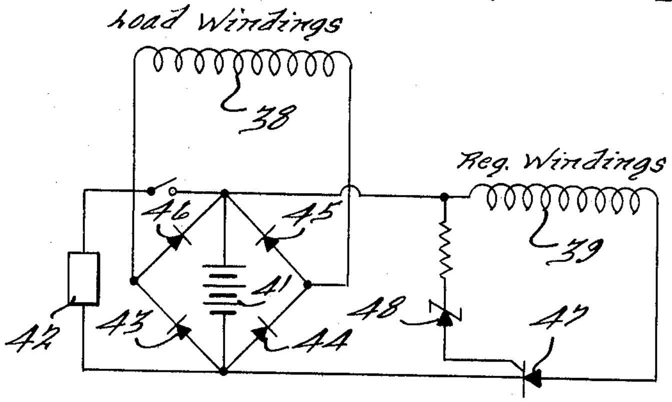
FIG. 6 is an electrical circuit diagram which is the equivalent of the FIGURE 5 diagram.

The circuit is shown schematically in FIGURE 6, the load windings being connected by means of a full wave rectifier bridge circuit having 4 diodes 43, 44, 45 and 46 to a battery 41 which supplies a load 42. Regulating windings 39 are connected across the battery terminals, a silicon controlled rectifier 47 being in series with windings 39 and being controlled by a zener diode 48. Each pole 40 carries a portion of the load windings 38 and a portion of the regulating windings 39, and regulation is accomplished by the control of current through the regulating windings, this in turn being controlled by gating of the silicon controlled rectifier by the zener diode, as described more particularly in the above-mentioned copending application.

Figures 4, 5:
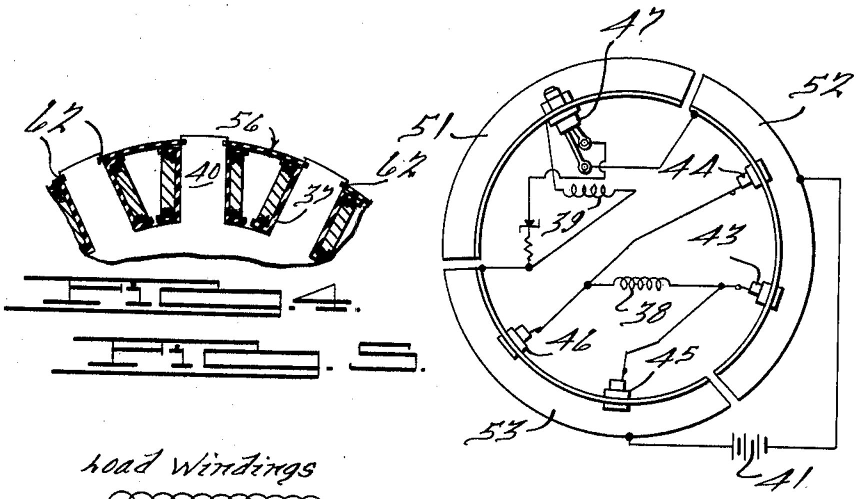
FIG. 4 is a fragmentary side elevational view of two poles showing the manner in which the heat sink supporting members retain the coils on the poles.
FIG. 5 is a diagrammatic view showing the manner in which the heat sink segments form portions of the electrical circuit.

The heat sink is generally indicated at 49 and comprises three circumferentially arranged arcuate heat sink members 51, 52 and 53, as seen in FIGURES 2 and 5. The three members have identical cross sectional shapes, that is, an L-shape as seen in FIGURE 1 with a radially flat portion 54 and a partially cylindrical or arcuate portion 55. Heat sink members 51, 52 and 53 may be fabricated of a highly heat conductive and heat-absorptive metal which will absorb and dissipate heat from the components mounted thereon. Preferably, the material is also highly electrically conductive.

Figure 3:
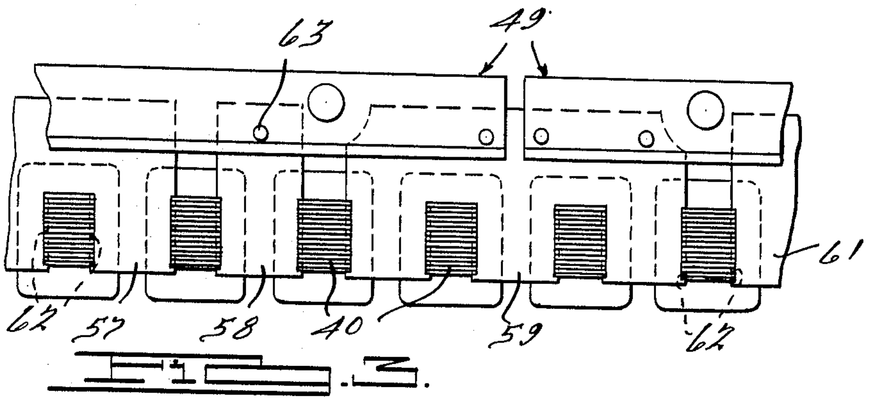
FIG. 3 is a fragmentary developed plan view of portinons of two heat sink segments and the core poles on which they are mounted, showing the insulative mounting members.

The outer diameter of heat sink 49 is approximately the same or slightly greater than the outer diameter of rotor 14, as seen in FIGURE 1, and the heat sink is mounted within housing 12 between the inner end of rotor 14 and the end wall 16 of the housing. The mounting means for heat sink 49 comprises a plurality of circumferentially spaced mounting or supporting members generally indicated at 56 in FIGURES 1 and 2, four of the members, 57, 58, 59 and 61 being illustrated in FIGURE 3. Members 56 are fabricated of a relatively stiff electrically insulative sheet material which suitably has a certain amount of resiliency, and the members are bent so as to be included in an imaginary circle concentric with stator 13 and with a diameter slightly less than the diameter of a circle passing through the outer pole faces of the stator. Each member 56 has a mounting portion adapted to fit tightly when so bent between two adjacent poles 40, as seen in FIGURE 3; the outer ends of the poles are provided with retaining slots 62 for this purpose which will tightly retain members 56 while holding their arcuate shape, as seen in FIGURE 4. Slots 62 are disposed immediately outwardly of bobbins 37 which support coil 36, so that members 56 will engage the outer ends of the bobbins and hold them in position on their respective poles 40.

Members 56 extend from poles 40 toward end wall 16 of housing 12, and heat sink segments 51, 52 and 53 are secured to members 56 by such means as rivets 63 seen in FIGURE 1. The heat sink segments are mounted in axially spaced relation with rotor 14 and are spaced from each other, as seen in FIGURE 2.

Components 43 to 47 are secured to the heat sink in a manner such that the latter will not only absorb heat from the components but will also serve as conductors for portions of the circuit. In the illustrated embodiment, silicon controlled rectifier 47 is mounted on heat sink 51 by means of a slotted projection 64 on portion 55 of the heat sink segment which extends through aperture 21 of the housing, rectifier 47 having a metallic housing which is secured to the slotted portion in heat-conductive relation with segment 51. Diodes 45 and 46 are secured to portion 55 of segment 53, extending through apertured portions in this segment, and have metallic housings which are in heat-conductive relation therewith. Segment 53 also acts as an electrical conductor for connecting the positive terminal of battery 41 with diodes 45 and 46, as seen in FIGURE 5. This connection is by means of a strap 65 connecting segment 53 with a post 66 mounted on wall 16 of housing 12 but insulated therefrom, as seen in FIGURE 2. Likewise, diodes 43 and 44 are secured to segment 52 of the heat sink in heat-conductive relation therewith and segment 52 acts as a conductor for connecting these diodes to the negative or ground terminal of battery 41. The latter connection is by means of a tab 67 connecting heat sink 52 with a grounding post 68 on wall 16 of housing 12. The other electrical connections will be made as seen in FIGURES 5 and 6, it being noted that the proximity of the heat sink to the stator coils will facilitate the connections thereto.

The shape of the various heat sink supporting members 56 vary, some elements such as members 57 and 59 having comb-like shapes and fitting in the interstices between several adjacent poles, while others, such as member 58, are secured only between two adjacent poles. Preferably, adjacent ends of the three segments 51, 52 and 53 of heat sink 49 are secured to the same supporting member; for example, adjacent members of two segments of heat sink 49 are secured to member 59, as seen in FIGURE 3. This continuous arcuate effect will add rigidity to the assembly.

In operation of generator 11, heat sink 49 will act to absorb and dissipate heat from components 43 to 47. It will be noted that the heat sink is in the path of air flow through housing 12, being aligned with openings 17 to 21, so that cooling of the heat sink will be facilitated. At the same time, heat sink 49 will occupy a minimum of extra space within the generator housing.

Should it be desired to repair or replace any of coils 36, members 56 may be slipped out from retaining slots 62, permitting bobbins 37 to be slipped off poles 40.

Figure 7:
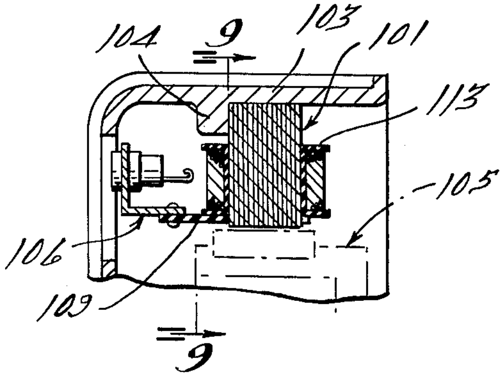
FIG. 7 is a fragmentary cross-sectional view in elevation of a modified form of the heat sink for use with a stator surrounding the rotor.
Figures 8, 9:
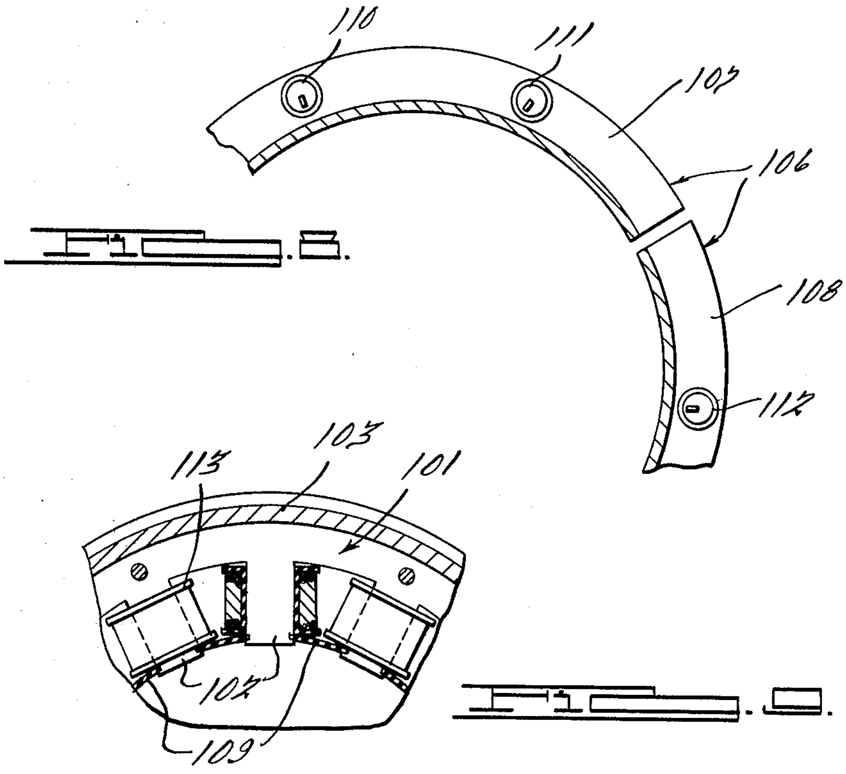
FIG. 8 is a fragmentary end elevational view of a portion of the heat sink of FIGURE 7.
FIG. 9 is a cross-sectional view taken along the line 9—9 of FIGURE 7.

FIGURES 7, 8 and 9 illustrate a modified form of the invention having the same basic constructional principles as the previous embodiment but intended to be used in conjunction with a stator which surrounds rather than is enclosed by the rotor. In this embodiment the stator is generally indicated at 101 and is of annular shape, having a plurality of radially inwardly extending poles 102. The stator is mounted within the cylindrical portion of a bell-shaped housing 103 against a shoulder 104 thereof, the rotor being indicated generally in dot-dash lines at 105 and being rotatable within stator 101.

The heat sink is generally indicated at 106 and comprises a plurality of segments two of which are indicated at 107 and 108 in FIGURE 8. These segments have L-shaped cross sections and are circumferentially arranged in the same manner as the segments of the previously described heat sink, except that the radially flat portions of the heat sink segments are adjacent rather than remote from the flat end of housing 103. The partially cylindrical portions of the heat sink segments are secured to supporting members 109 which are constructed in the same manner as those of the previous embodiments; however, the electronic components, such as components 110, 111 and 112 in FIGURES 7 and 8, are secured in heat-conductive relation with the radially flat heat sink portions and not the partially cylindrical portions. As in the previous embodiment, supporting members 109 will be in tightly interfitting engagement with the ends of the poles of stator 101, thus retaining in place the coils 113 mounted on poles 102; this is seen in FIGURE 9.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a heat sink construction for a generator having a stator and rotor, a plurality of circumferentially arranged arcuate heat sink segments, said segments being fabricated of material having high heat-conductive properties, electronic components carried by said heat sink segments, and circumferentially arranged arcuate insulative members having like ends secured to said stator and their other ends extending to one side of said stator, said heat sink segments being secured to said other ends of said insulative members.

2. In a heat sink construction for use in conjunction with a generator having a multiple pole stator and a generator regulator circuit having electronic components, at least one arcuate heat sink member fabricated of highly heat-conductive material and arranged concentrically with said stator, at least one of said components being secured to said heat sink member in heat-conductive relation therewith, and a relatively rigid electrically insulative member secured at one end to said stator and at the other end to said heat sink member.

3. In a heat sink construction for use in conjunction with a generator having a multiple pole stator with coils on said poles and a regulator circuit having electronic components, at least one arcuate heat sink member fabricated of highly heat-conductive material and concentric with said stator, at least one of said electronic components being secured to said heat sink member in heat-conductive relation therewith, and a heat sink supporting member of relatively stiff insulative materal having one end tightly interfitting between two adjacent poles of said stator in such manner as to retain the coils on said poles, said heat sink member being secured to the other end of said supporting member.

4. In a heat sink construction for use in conjunction with a generator having a multiple pole stator with coils thereon and a regulating circuit with electronic components, a plurality of circumferentially arranged arcuate heat sink members, the members being in spaced relation and being each fabricated of a highly heat-conductive materal, said electronic components being secured to said segments in heat-conductive relation therewith, and supporting means for said segments comprising a plurality of circumferentially arranged relatively stiff electrically insulative sheet members, said members having portions tightly interfitting between the ends of adjacent poles so as to hold the coils on said poles, the supporting members extending to one side of said stator, said heat sink segments being secured to the supporting members on said one side of the stator.

5. The combination according to claim 4, the material from which said heat sink segments are fabricated also being electrically conductive whereby they may act as electrical conductors for portions of said regulating circuit.

6. The combination according to claim 4, said heat sink segments having L-shaped cross sections with radially flat portions and cylindrical portions, said supporting members being secured to the cylindrical portions of said segments.

7. The combination according to claim 4, at least some of said supporting members having a plurality of said tightly interfitting portions disposed in a plurality of interstices between adjacent stator poles.

8. The combination according to claim 4, the ends of said stator poles having retaining slots for the reception of the edges of said supporting members, at least one of said supporting members being secured to two adjacent segments.

9. In combination, a bell-shaped generator housing having a radial portion and a cylindrical portion, a stator secured within said housing and having radially extending coil-carrying poles, a permanent magnet rotor rotatably mounted in said housing adjacent said poles, a heat sink comprising a plurality of arcuate heat-conductive segments disposed between said rotor and the radial portion of said housing, electronic components carried by said heat sink segments, and supporting members for said heat sink of electrically insulative material, said members having portions tightly interfitting between adjacent poles of said stator and holding the coils on said poles, and other portions extending toward said radial housing end, said heat sink segments being secured to said other portions of said supporting members.

References Cited by the Examiner

UNITED STATES PATENTS

| | | | |
|---|---|---|---|
| 2,934,662 | 4/1960 | Robinson | 310—68 |
| 3,001,121 | 9/1961 | Kerr | 310—68 |
| 3,041,484 | 6/1962 | Freer et al. | 310—68 |

MILTON O. HIRSHFIELD, *Primary Examiner.*

ORIS L. RADER, L. L. SMITH, *Assistant Examiners.*